United States Patent
Xu et al.

(10) Patent No.: US 10,634,871 B2
(45) Date of Patent: Apr. 28, 2020

(54) LOW-PROFILE DUAL-AXIS DEFLECTION DEVICE HAVING DEFLECTION AXES INTERSECTING AT MIRROR SURFACE AND METHOD FOR ACHIEVING DUAL-AXILA DEFLECTION

(71) Applicant: XI'AN JIAOTONG UNIVERSITY, Xi'an, Shaanxi (CN)

(72) Inventors: Minglong Xu, Shaanxi (CN); Siyang Song, Shaanxi (CN); Zheng Tian, Shaanxi (CN); Bo Feng, Shaanxi (CN); Shubao Shao, Shaanxi (CN)

(73) Assignee: XI'AN JIAOTONG UNIVERSITY, Xi'an (CN)

( * ) Notice: Subject to any disclaimer, the term of this patent is extended or adjusted under 35 U.S.C. 154(b) by 0 days.

(21) Appl. No.: 16/411,047

(22) Filed: May 13, 2019

(65) Prior Publication Data

US 2019/0271827 A1    Sep. 5, 2019

Related U.S. Application Data

(63) Continuation of application No. PCT/CN2017/099189, filed on Aug. 26, 2017.

(30) Foreign Application Priority Data

Dec. 27, 2016  (CN) .......................... 2016 1 1224947

(51) Int. Cl.
G02B 7/198 (2006.01)
G02B 26/08 (2006.01)

(52) U.S. Cl.
CPC ......... *G02B 7/198* (2013.01); *G02B 26/0858* (2013.01)

(58) Field of Classification Search
None
See application file for complete search history.

(56) References Cited

U.S. PATENT DOCUMENTS 3,150,337 A * 9/1964 Allison .................... H03H 9/24
                                                         333/186
4,732,440 A * 3/1988 Gadhok ............... G02B 7/1821
                                                         359/214.1

(Continued)

FOREIGN PATENT DOCUMENTS

CN    102981243 A    3/2013
CN    102981245 A    3/2013

(Continued)

*Primary Examiner* — Jennifer D. Carruth
(74) *Attorney, Agent, or Firm* — Wayne & Ken, LLC; Tony Hom

(57) ABSTRACT

A low-profile dual-axial deflection device having deflection axes intersecting at a mirror surface and method for achieving dual-axis deflection are disclosed, the device including essentially three parts: a base and a fixing support for fixing and mounting; elastic kite-shaped seats and deflection support base providing deflection driving, and a mirror carrier, a mirror and flexible hinges and connecting stations for limiting deflection displacement of the mirror carrier. The present disclosure uses four piezoelectric ceramics to realize the output control of the deflection angle, and has high control precision and fast response. Simultaneous driving of four piezoelectric ceramics can realize dual-axis deflection of the mirror. The device adopts a sinking mirror structure, and the deflection axes intersect at the surface of the mirror, thereby reducing the optical path control error caused by the longitudinal displacement of the mirror during deflection. The structure is compact and can be installed in limited space.

3 Claims, 4 Drawing Sheets

(56) References Cited

U.S. PATENT DOCUMENTS

| | | | |
|---|---|---|---|
| 5,535,047 A * | 7/1996 | Hornbeck | G02B 26/0841 359/295 |
| 5,550,669 A * | 8/1996 | Patel | G01C 11/02 248/485 |
| 7,233,424 B2 * | 6/2007 | Fischer | B23K 26/10 359/200.7 |
| 9,304,314 B1 * | 4/2016 | Knirck | G02B 26/0841 |
| 10,203,475 B2 * | 2/2019 | Balaban | H01F 7/06 |
| 2008/0278789 A1 * | 11/2008 | Tanaka | G02B 26/0825 359/224.1 |
| 2009/0180167 A1 | 7/2009 | Tani et al. | |
| 2009/0279163 A1 * | 11/2009 | Kurozuka | G02B 26/0841 359/291 |
| 2010/0103499 A1 * | 4/2010 | George | G02B 26/0841 359/291 |
| 2013/0250390 A1 | 9/2013 | Tani | |

FOREIGN PATENT DOCUMENTS

| | | |
|---|---|---|
| CN | 103913838 A | 7/2014 |
| CN | 104375258 A | 2/2015 |
| CN | 104849858 A | 8/2015 |
| CN | 105301761 A | 2/2016 |
| CN | 105301762 A | 2/2016 |
| CN | 105403999 S | 3/2016 |
| CN | 106195556 A | 12/2016 |
| CN | 106526785 A | 3/2017 |

* cited by examiner

LOW-PROFILE DUAL-AXIS DEFLECTION DEVICE HAVING DEFLECTION AXES INTERSECTING AT MIRROR SURFACE AND METHOD FOR ACHIEVING DUAL-AXILA DEFLECTION

CROSS-REFERENCE TO RELATED APPLICATIONS

This application is a continuation of International Application No. PCT/CN2017/099189, filed on Aug. 26, 2017, which claims priority from Chinese Patent Application No. 201611224947.6, filed on Dec. 27, 2016, both of which are hereby incorporated by reference in their entireties.

TECHNICAL FIELD

The present disclosure relates to a dual-axial deflection device and an implementation method thereof, in particular to a low-profile dual-axial deflection device having deflection axes intersecting at a mirror surface and method for achieving dual-axial.

BACKGROUND

In recent years, astronomical telescopes, microscopes, and other precision optical systems have become more and more widely used in aerospace engineering and biotechnology, and have put forward higher requirements for precision optical path control. In response to this demand, piezoelectric ceramics and flexible hinge structure can be used to achieve multi-axis deflection. However, the current technology still has some problems. First, the piezoelectric deflection mechanism currently on the market generally has a relatively high longitudinal dimension, and the large installation space is required. The height also limits the fundamental frequency of the structure, reducing reliability. Secondly, due to the flexible hinge position design currently used, when the mirror output is off-angle, a displacement in the height direction will be caused for the center of the mirror, and the center of the mirror where the reflected spot is located does not intersect with the structural deflection axis, so the accuracy needs to be improved.

SUMMARY

In order to overcome the problems of the prior art described above, to eliminate the optical path control error caused by the non-coincidence of the reflected light spot and the structural deflection axis, and at the same time to reduce the profile of the structure, an object of the present disclosure is to provide a low-profile dual-axis deflection device having the deflection axes intersecting at the surface of the mirror and method for achieving dual-axis deflection. A piezoelectric ceramic is used to drive the mirror device, and a sinking mirror mounting structure is adopted, so that the structural deflection center is located on the mirror surface, and the device also has a compact structure, especially having a low profile, fast deflection response and high precision.

In order to achieve the above object, the technical solution adopted by the present disclosure is:

A low-profile dual-axis deflection device having deflection axes intersecting at a mirror surface, including: a base, a first fixing support, a second fixing support, a third fixing support and fourth fixing support mounted on the base, a first elastic kite-shaped seat fixed at one end to the first fixing support, a second elastic kite-shaped seat fixed at one end to the second fixing support, a third elastic kite-shaped seat fixed at one end to the third fixing support, and a fourth elastic kite-shaped seat fixed at one end to the fourth fixing support, a first piezoelectric ceramic horizontally mounted in the first elastic kite-shaped seat, a second piezoelectric ceramic horizontally mounted in the second elastic kite-shaped seat, a third piezoelectric ceramic horizontally mounted in the third elastic kite-shaped seat, a fourth piezoelectric ceramic horizontally mounted in the fourth elastic kite-shaped seat, a deflection support connected to the first elastic kite-shaped seat, the second elastic kite-shaped seat, the third elastic kite-shaped seat and the fourth elastic kite-shaped seat through flexible hinges, a mirror carrier fixedly connected to the deflection support, a mirror placed above the mirror carrier, a first connecting station connected to the mirror carrier through a flexible hinge and fixed to the first fixing support, a second connecting station connected to the mirror carrier through a flexible hinge and fixed to the second fixing support, a third connecting station connected to the mirror carrier through a flexible hinge and fixed to the third fixing support, and a fourth connecting station connected to the mirror carrier through a flexible hinge and fixed to the fourth fixing support; the first elastic kite-shaped seat and the second elastic kite-shaped seat are symmetrical about the Y-axis, and the third elastic kite-shaped seat and the fourth elastic kite-shaped seat are symmetrical about the X-axis; the mirror is mounted in a settling manner and mounted inside the mirror carrier, and an upper surface of the mirror is in a same plane with an centerline of the flexible hinges to ensure that the deflection axes intersect at the mirror surface, the first connecting station, the second connecting station, the third connecting station and the fourth connecting station being connected with the flexible hinges.

A method for achieving dual-axial deflection using the low-profile dual-axial deflection device having deflection axes intersecting at a mirror surface, wherein when the third piezoelectric ceramic and the fourth piezoelectric ceramic are differentially driven, the deflection support is moved to achieve deflection about the X-axis direction; when the first piezoelectric ceramic and the second piezoelectric ceramic are differentially driven, the deflection support is moved to achieve deflection about the Y-axis direction; and when the third piezoelectric ceramic and the fourth piezoelectric ceramic as well as the first piezoelectric ceramic and the second piezoelectric ceramic are differentially driven simultaneously, dual-axial deflection of the deflection axes intersecting at the surface of the mirror is achieved.

A specific method is: when the mirror is deflected about a positive direction of the X-axis, the third piezoelectric ceramic and the fourth piezoelectric ceramic operate in a differential manner, the fourth piezoelectric ceramic is elongated, and the third piezoelectric ceramic is shortened by a same amount, a linear displacement output of the electric ceramic is loaded on the third elastic kite-shaped seat and the fourth elastic kite-shaped seat, the third elastic kite-shaped seat is elongated in a short axis direction, the fourth elastic kite-shaped seat is shortened in the short axis direction, pushing the deflection support to be moved in a negative direction of the Y-axis; being subjected to restrictions from the first connecting station, the second connecting station, the third connecting station, the fourth connecting station and their flexible hinges, the deflection support and the mirror carrier carry the mirror to deflect about the positive direction of the X-axis; similarly, as for deflection about a negative direction of the X-axis, the third piezoelectric ceramic and the fourth piezoelectric ceramic also operate in a differential manner, the fourth piezoelectric ceramic is shortened, and the third piezoelectric ceramic is elongated by a same amount, to carry the mirror to deflect about the negative direction of the X-axis;

Similarly, the first piezoelectric ceramic and the second piezoelectric ceramic operate in a differential manner, one piezoelectric ceramic is elongated while the other electric ceramic is shortened by a same amount, to carry the mirror to deflect about positive and negative directions of the Y-axis; the first piezoelectric ceramic, the second piezoelectric ceramic, the third piezoelectric ceramic, and the fourth piezoelectric ceramic cooperate to achieve control of dual-axial deflection of the mirror, since the deflection axis X and the deflection axis Y intersect on an upper surface of the mirror, thus reducing optical path control error caused by longitudinal displacement of the mirror.

Compared with the prior art, the present disclosure has the following advantages:

1. Piezoelectric ceramic is used to move the flexible hinge to realize mirror deflection. There is no error caused by friction and gap, and the deflection adjustment can be responded fast and is carried out with high precision.

2. The structure has a low longitudinal profile and a compact structure, which is convenient for installation and use in limited space, especially in a case where the longitudinal depth is low.

3. The deflection axes are orthogonal to each other and coplanar with the mirror surface, which reduces the optical path control error caused by the longitudinal translation of the mirror surface.

DETAILED DESCRIPTION OF EMBODIMENTS

The present disclosure will be further described in detail below in conjunction with the drawings and specific embodiments.

Figure 1:
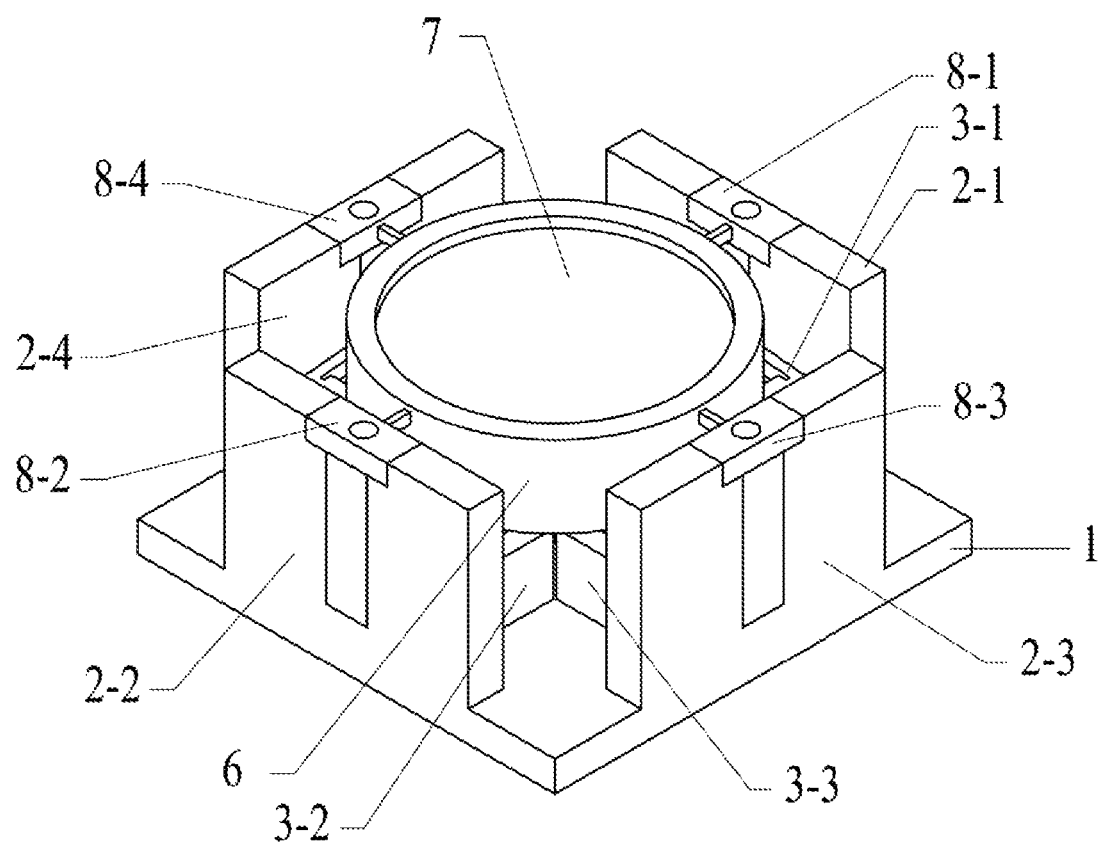
FIG. 1 is a schematic view of the structure of the present disclosure.
Figure 2:
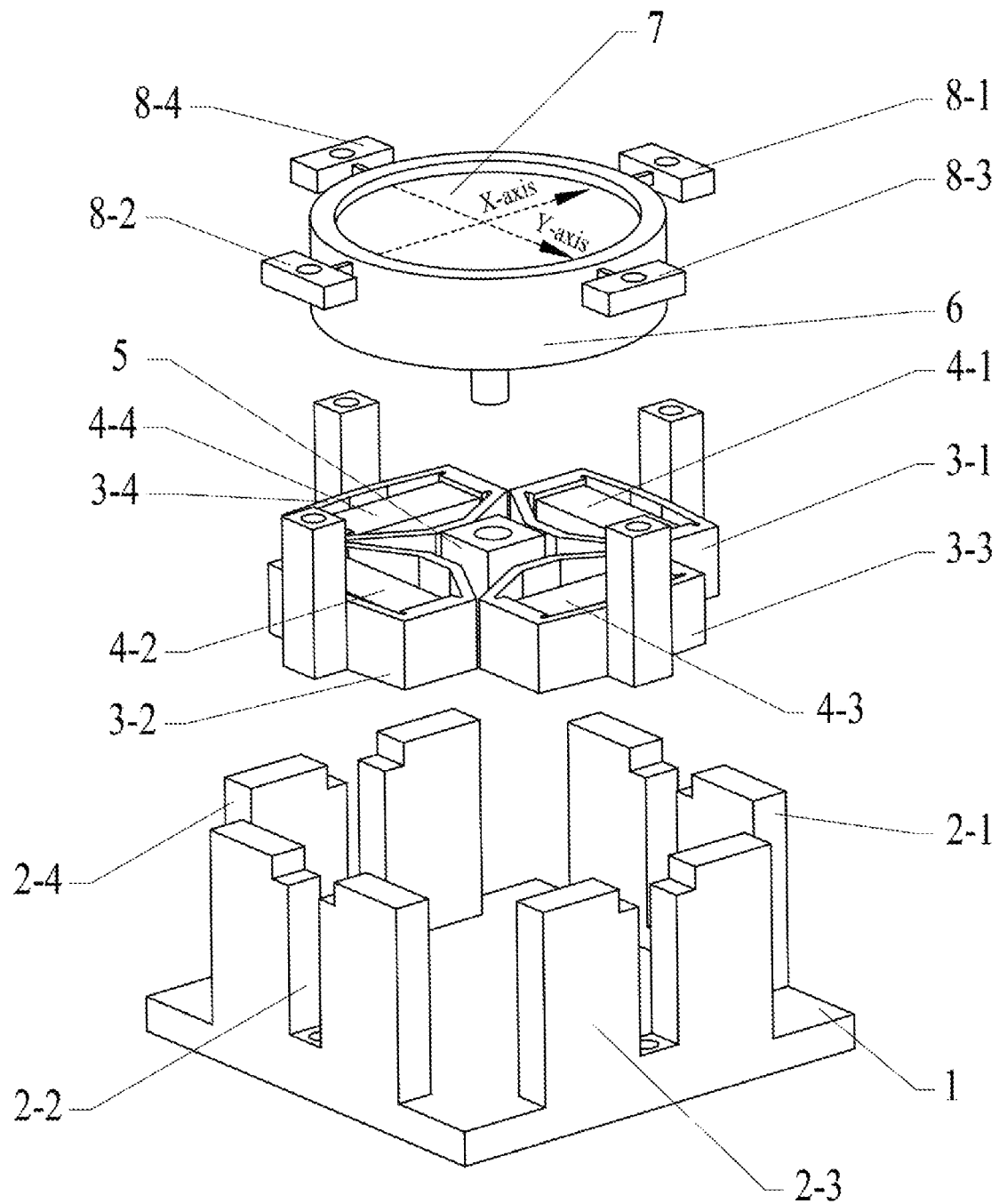
FIG. 2 is an explosive view of the structure of the present disclosure.
Figure 3:
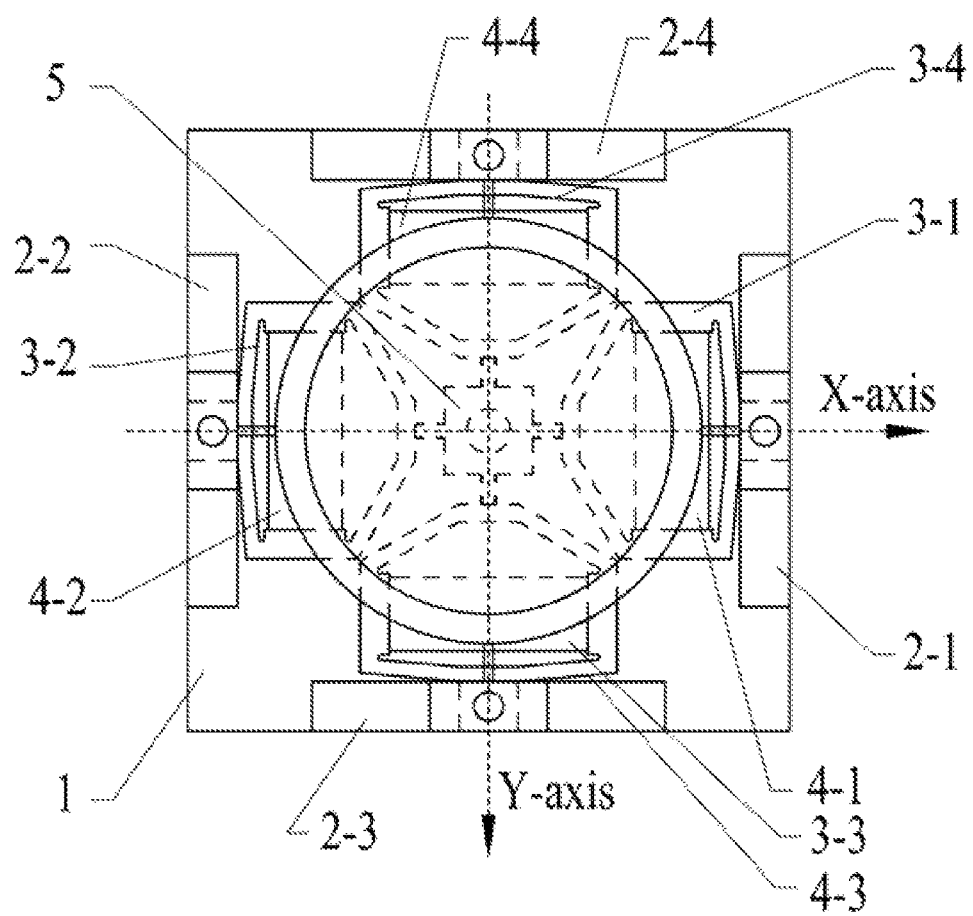
FIG. 3 is a plan view of the structure of the present disclosure.

As shown in FIG. 1, FIG. 2 and FIG. 3, a low-profile dual-axis deflection device having deflection axes intersecting at a mirror surface of the present disclosure includes: a base 1, a first fixing support 2-1, a second fixing support 2-2, a third fixing support 2-3 and fourth fixing support 2-4 mounted on the base 1, a first elastic kite-shaped seat 3-1 fixed at one end to the first fixing support 2-1, a second elastic kite-shaped seat 3-2 fixed at one end to the second fixing support 2-2, a third elastic kite-shaped seat 3-3 fixed at one end to the third fixing support 2-3, and a fourth elastic kite-shaped seat 3-4 fixed at one end to the fourth fixing support 2-4, a first piezoelectric ceramic 4-1 horizontally mounted in the first elastic kite-shaped seat 3-1, a second piezoelectric ceramic 4-2 horizontally mounted in the second elastic kite-shaped seat 3-2, a third piezoelectric ceramic 4-3 horizontally mounted in the third elastic kite-shaped seat 3-3, a fourth piezoelectric ceramic 4-4 horizontally mounted in the fourth elastic kite-shaped seat 3-4, a deflection support 5 connected to the first elastic kite-shaped seat 3-1, the second elastic kite-shaped seat 3-2, the third elastic kite-shaped seat 3-3 and the fourth elastic kite-shaped seat 3-4 through flexible hinges, a mirror carrier 6 fixedly connected to the deflection support 5, a mirror 7 placed above the mirror carrier 6, a first connecting station 8-1 connected to the mirror carrier 6 through a flexible hinge and fixed to the first fixing support 2-1, a second connecting station 8-2 connected to the mirror carrier 6 through a flexible hinge and fixed to the second fixing support 2-2, a third connecting station 8-3 connected to the mirror carrier 6 through a flexible hinge and fixed to the third fixing support 2-3, and a fourth connecting station 8-4 connected to the mirror carrier 6 through a flexible hinge and fixed to the fourth fixing support 2-4; the first elastic kite-shaped seat 3-1 and the second elastic kite-shaped seat 3-2 are symmetrical about the Y-axis, and the third elastic kite-shaped seat 3-3 and the fourth elastic kite-shaped seat 3-4 are symmetrical about the X-axis; the mirror 7 is mounted in a settling manner, mounted inside the mirror carrier 6, and an upper surface of the mirror 7 is in a same plane with an centerline of the flexible hinges to ensure that the deflection axes intersect at the mirror surface, the first connecting station 8-1, the second connecting station 8-2, the third connecting station 8-3 and the fourth connecting station 8-4 being connected with the flexible hinges.

The low-profile dual-axial deflection device having the deflection axes intersecting at the mirror surface described above can realize the dual-axial deflection with the mirror center as the deflection center; when the mirror 7 is deflected about a positive direction of the X-axis, the third piezoelectric ceramic 4-3 and the fourth piezoelectric ceramic 4-4 operate in a differential manner, the fourth piezoelectric ceramic 4-4 is elongated, and the third piezoelectric ceramic 4-3 is shortened by a same amount, a linear displacement output of the electric ceramic is loaded on the third elastic kite-shaped seat 3-3 and the fourth elastic kite-shaped seat 3-4, the third elastic kite-shaped seat 3-3 is elongated in a short axis direction, the fourth elastic kite-shaped seat 3-4 is shortened in the short axis direction, pushing the deflection support 5 to be moved in a negative direction of the Y-axis; being subjected to restrictions from the first connecting station 8-1, the second connecting station 8-2, the third connecting station 8-3, the fourth connecting station 8-4 and their flexible hinges, the deflection support 5 and the mirror carrier 6 carry the mirror 7 to deflect about the positive direction of the X-axis; similarly, as for deflection about a negative direction of the X-axis, the third piezoelectric ceramic 4-3 and the fourth piezoelectric ceramic 4-4 also operate in a differential manner, the fourth piezoelectric ceramic 4-4 is shortened, and the third piezoelectric ceramic 4-3 is elongated by a same amount, to carry the mirror 7 to deflect about the negative direction of the X-axis.

Similarly, the first piezoelectric ceramic 4-1 and the second piezoelectric ceramic 4-2 operate in a differential manner, one piezoelectric ceramic is elongated while the other electric ceramic is shortened by a same amount, to carry the mirror 7 to deflect about positive and negative directions of the Y-axis; the first piezoelectric ceramic 4-1, the second piezoelectric ceramic 4-2, the third piezoelectric ceramic 4-3, and the fourth piezoelectric ceramic 4-4 cooperate to achieve control of dual-axial deflection of the mirror, since the deflection axis X and the deflection axis Y intersect on an upper surface of the mirror 7, thus reducing optical path control error caused by longitudinal displacement of the mirror.

Figure 4:
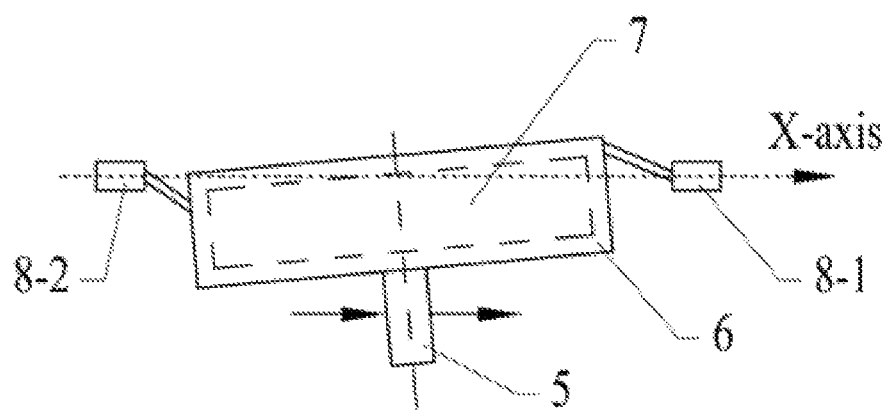
FIG. 4 is a schematic diagram of the principle of the present disclosure.

As shown in FIG. 4, the operation principle of the device for moving the mirror 7 to deflect is described. When the structure moves the mirror 7 to deflect about the Y-axis which is coplanar with the mirror surface, the first piezoelectric ceramic 4-1 is elongated and causes the first elastic kite-shaped seat 3-1 to be elongated in a long axis direction and shortened in a short axis direction, and the second piezoelectric ceramic 4-2 is shortened and causes the second elastic kite-shaped seat to be shortened in a long axis direction and elongated in a short axis direction. Shortening of the first elastic kite-shaped seat 3-1 in the short axis direction pulls the deflection support 5, and elongation of second elastic kite-shaped seat 3-2 in the short-axis direction pushes the deflection support 5. Under the restrictions of the first connecting station 8-1 and its flexible hinge as well as the second connecting station 8-2 and its flexible hinge, the deflection support 5, the mirror carrier 6 and the mirror 7 will deflect about the Y-axis coplanar with the mirror 7.

What is claimed is:

1. A low-profile dual-axis deflection device having deflection axes intersecting at a mirror surface, comprising: a base, a first fixing support, a second fixing support, a third fixing support and fourth fixing support mounted on the base, a first elastic kite-shaped seat fixed at one end to the first fixing support, a second elastic kite-shaped seat fixed at one end to the second fixing support, a third elastic kite-shaped seat fixed at one end to the third fixing support, and a fourth elastic kite-shaped seat fixed at one end to the fourth fixing support, a first piezoelectric ceramic horizontally mounted in the first elastic kite-shaped seat, a second piezoelectric ceramic horizontally mounted in the second elastic kite-shaped seat, a third piezoelectric ceramic horizontally mounted in the third elastic kite-shaped seat, a fourth piezoelectric ceramic horizontally mounted in the fourth elastic kite-shaped seat, a deflection support connected to the first elastic kite-shaped seat, the second elastic kite-shaped seat, the third elastic kite-shaped seat and the fourth elastic kite-shaped seat through flexible hinges, a mirror carrier fixedly connected to the deflection support, a mirror placed above the mirror carrier, a first connecting station connected to the mirror carrier through a flexible hinge and fixed to the first fixing support, a second connecting station connected to the mirror carrier through a flexible hinge and fixed to the second fixing support, a third connecting station connected to the mirror carrier through a flexible hinge and fixed to the third fixing support, and a fourth connecting station connected to the mirror carrier through a flexible hinge and fixed to the fourth fixing support; the first elastic kite-shaped seat and the second elastic kite-shaped seat are symmetrical about the Y-axis, and the third elastic kite-shaped seat and the fourth elastic kite-shaped seat are symmetrical about the X-axis; the mirror is mounted in a settling manner and mounted inside the mirror carrier, and an upper surface of the mirror is in a same plane with an centerline of the flexible hinges to ensure that the deflection axes intersect at the mirror surface, the first connecting station, the second connecting station, the third connecting station and the fourth connecting station being connected with the flexible hinges.

2. A method for achieving dual-axial deflection using the low-profile dual-axial deflection device having deflection axes intersecting at a mirror surface of claim 1, wherein when the third piezoelectric ceramic and the fourth piezoelectric ceramic are differentially driven, the deflection support is moved to achieve deflection about the X-axis direction; when the first piezoelectric ceramic and the second piezoelectric ceramic are differentially driven, the deflection support is moved to achieve deflection about the Y-axis direction; and when the third piezoelectric ceramic and the fourth piezoelectric ceramic as well as the first piezoelectric ceramic and the second piezoelectric ceramic are differentially driven simultaneously, dual-axial deflection of the deflection axes intersecting at the surface of the mirror is achieved.

3. The method according to claim 2, wherein a specific method of achieving the deflection about the X-axis direction is: when the mirror is deflected about a positive direction of the X-axis, the third piezoelectric ceramic and the fourth piezoelectric ceramic operate in a differential manner, the fourth piezoelectric ceramic is elongated, and the third piezoelectric ceramic is shortened by a same amount, a linear displacement output of the electric ceramic is loaded on the third elastic kite-shaped seat and the fourth elastic kite-shaped seat, the third elastic kite-shaped seat is elongated in a short axis direction, the fourth elastic kite-shaped seat is shortened in the short axis direction, pushing the deflection support to be moved in a negative direction of the Y-axis; being subjected to restrictions from the first connecting station, the second connecting station, the third connecting station, the fourth connecting station and their flexible hinges, the deflection support and the mirror carrier carry the mirror to deflect about the positive direction of the X-axis; similarly, as for deflection about a negative direction of the X-axis, the third piezoelectric ceramic and the fourth piezoelectric ceramic also operate in a differential manner, the fourth piezoelectric ceramic is shortened, and the third piezoelectric ceramic is elongated by a same amount, to carry the mirror to deflect about the negative direction of the X-axis;

as for achieving deflection about the Y-axis direction, similarly, the first piezoelectric ceramic and the second piezoelectric ceramic operate in a differential manner, one piezoelectric ceramic is elongated while the other electric ceramic is shortened by a same amount, to carry the mirror to deflect about positive and negative directions of the Y-axis;

the first piezoelectric ceramic, the second piezoelectric ceramic, the third piezoelectric ceramic, and the fourth piezoelectric ceramic cooperate to achieve control of dual-axial deflection of the mirror, since the deflection axis X and the deflection axis Y intersect on an upper surface of the mirror, thus reducing optical path control error caused by longitudinal displacement of the mirror.

* * * * *